United States Patent [19]

Nishijima et al.

[11] Patent Number: 5,574,611

[45] Date of Patent: Nov. 12, 1996

[54] SERVICE INTERRUPTION MINIMIZING SYSTEM FOR POWER DISTRIBUTION LINE

[75] Inventors: Kazuo Nishijima, Katsuta; Hiroshi Inoue, Hitachi; Minoru Kanoi; Terunobu Miyazaki, both of Toukai-mura; Mitsuru Nakamura, Katsuta, all of Japan

[73] Assignee: Hitachi, Ltd., Tokyo, Japan

[21] Appl. No.: 202,804

[22] Filed: Feb. 28, 1994

[30] Foreign Application Priority Data

Mar. 1, 1993 [JP] Japan .................................. 5-039645

[51] Int. Cl.$^6$ .................................................. H02H 7/26
[52] U.S. Cl. ................................. 361/64; 361/68; 361/69
[58] Field of Search .................................. 361/64, 66, 68, 361/69, 72, 67

[56] References Cited

U.S. PATENT DOCUMENTS 4,476,511  10/1984  Saleeta et al. ............................... 361/96
4,760,488   7/1988  Kishimoto ................................... 361/67
5,305,174   4/1994  Morita et al. ............................... 361/63

OTHER PUBLICATIONS

"Distribution Line Technical Manual", Ohm K.K., Nov. 3, 1991, pp. 464–465.

Primary Examiner—Todd DeBoer
Attorney, Agent, or Firm—Fay, Sharpe, Beall, Fagan, Minnich & McKee

[57] ABSTRACT

Upon the occurrence of a fault on the first distribution line, a faulty section on the distribution line is pinpointed, then a tie point switchgear at the tie point between the first distribution line in which the fault occurred and the other normal second distribution line is closed to form a loop distribution system. Then, a switchgear adjacent to the fault point on the first distribution line is opened. An opposing switchgear adjacent to the fault point is opened on the condition that the fault occurrence continues after having been linked to the second distribution line. The above procedures are executed before the opening of the circuit breaker installed on the distribution bus bar.

6 Claims, 6 Drawing Sheets

SERVICE INTERRUPTION MINIMIZING SYSTEM FOR POWER DISTRIBUTION LINE

BACKGROUND OF THE INVENTION

The present invention relates to a service interruption minimizing system for a power distribution line and an operational method therefor, and more particularly, it relates to a service interruption minimizing system for a power distribution line which ensures a continuous operation of the distribution line in the case of a restorative fault which may occur on the distribution line, and the operational method therefor.

Conventional operation to remove a fault section on the distribution line is based on a time sequential protective method. One such example is set forth in the "Distribution Line Technical Manual" pp 464–465 issued from Ohm KK., Nov. 30, 1991.

In brief, according to this prior art method, a protective relay installed in a substation is operated when a fault occurs to interrupt a circuit breaker connected to the distribution line and switchgears disposed along the distribution line, are opened due to the out-of-voltage on the distribution line. Then, a restoration operation for restoring the power outage section starts with a reclosing of the circuit breaker. More specifically, the restoration proceeds as follows: a first switchgear located on the distribution line closest to the circuit breaker is reclosed by being applied with a voltage upon reclosing of the circuit breaker, then another switchgear next to the first switch is reclosed by being applied with a voltage upon reclosing of the first switch, to be followed sequentially by the subsequent switchgears. When a fault which occurs on the distribution line is a restorative one and the fault can be removed by opening the circuit breaker, a subsequent restoration operation can be carried out to settle the power outage. Further, if a fault is a persistent-cause fault, the circuit breaker is opened once again, permitting power supply only on the power side section of the fault section, thereby causing the subsequent sections of the distribution line to be cut off from the power supply.

The outline of the prior art time sequential protective method is as described above. This, however, has such a problem that there occurs an outage of power lasting about 30 to 60 seconds due to the opening of the circuit breaker. The recent wide applications and proliferation of computer systems have been such that any power outage itself is no more tolerated to occur in the distribution lines. Therefore, it is desired to realize a service interruption minimizing system suitable for the distribution lines, which is capable of supplying an uninterrupting power supply as much as possible, and a method thereof.

Incidentally, the faults occurring on the distribution lines, which is can be classified roughly into short-circuits and ground faults, with their ratios of occurrence being 2 and 8 accordingly. Moreover, 80 to 90 percent of the ground faults of the distribution lines are restorative-cause faults which occur due to mere contacting of branches of trees or the like.

According to the conventional time sequential protection method, even if a ground fault may be such a restorative-cause one as above, a preset protection sequence of the aforementioned steps is allowed to proceed, eventually causing a power outage.

SUMMARY OF THE INVENTION

Therefore, the main object of the invention is to provide a service interruption minimizing system for the distribution line and an operating method therefor, which ensures no service interruption section to occur in the case of a restorative-cause fault and limits the power outage only to a minimum fault section on the distribution line in the case of a persistent-cause fault.

According to the invention, if a fault occurs in the first distribution line, a fault section is determined, then a switchgear located at a tie point joining the second distribution line which is normal and the first distribution line in which the fault occurred is closed to form a loop distribution system. Then, a switchgear adjacent to the fault point on the first distribution line on the upper stream is opened. The other switchgear adjacent to the fault point on the downstream side of the fault is opened on the condition that the fault continues to be present after its having been linked with the second distribution line by closing the tie point switchgear. The above-mentioned procedures are executed before the circuit breaker of the distribution bus is opened.

According to the present invention, there will occur no service interruption since the operation of the switchgears is completed before the circuit breaker coupled to the distribution bus is opened, and since the subsequent sections downstream of the fault point on the first distribution are caused to be supplied from the second distribution line.

BRIEF DESCRIPTION OF THE DRAWINGS

The present invention will be described in further detail with reference to the accompanying drawings, in which.

DETAILED DESCRIPTION

Figure 1:
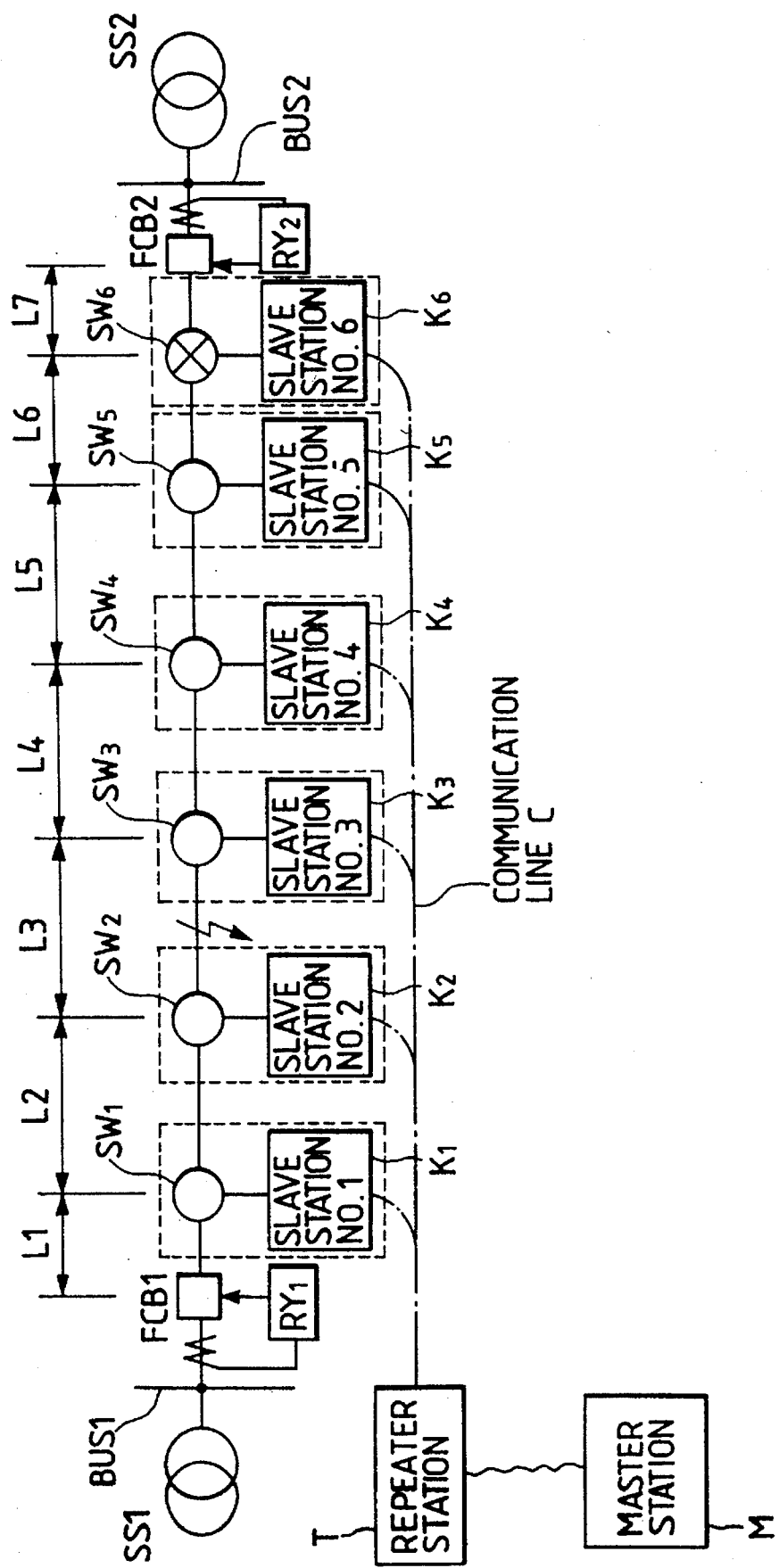
FIG. 1 is a schematic diagram illustrating a distribution system and a constitution of equipment embodying the present invention.

With reference to FIG. 1, there is shown a distribution system to which the present invention is applied, where each end of the distribution line L is connected to a bus of a substation SS via a circuit breaker FCB1, and switchgears Sw are installed at appropriate positions on the distribution line L. Of these switchgears Sw, all except Sw6 are in a closed state; thereby, sections on the distribution line from L1 to L6 are supplied with power from Bus 1 while a section L7 on the distribution line is supplied with power from Bus 2. Hereafter, sections to be supplied from the Bus 1 will be referred to as the first distribution line, and other sections to be supplied from the Bus 2 will be referred to as the second distribution line. The point of the switchgear Sw6 which is usually kept open may be referred to as a tie point.

The circuit breaker FCB is provided with a protective relay Ry, which upon detection of a fault on the distribution line opens the circuit breaker FCB, for example, in 0.7 sec. after the detection thereof. Each switchgear Sw is provided with a slave station K, with intervals between respective slave stations K being interconnected with a communication line C. Communication line C is connected to a master station M via a repeater station T. A signal from each slave station is transmitted to the master station M, and an instruction from the master station is transmitted vice versa to the slave station K as well.

Figure 2:
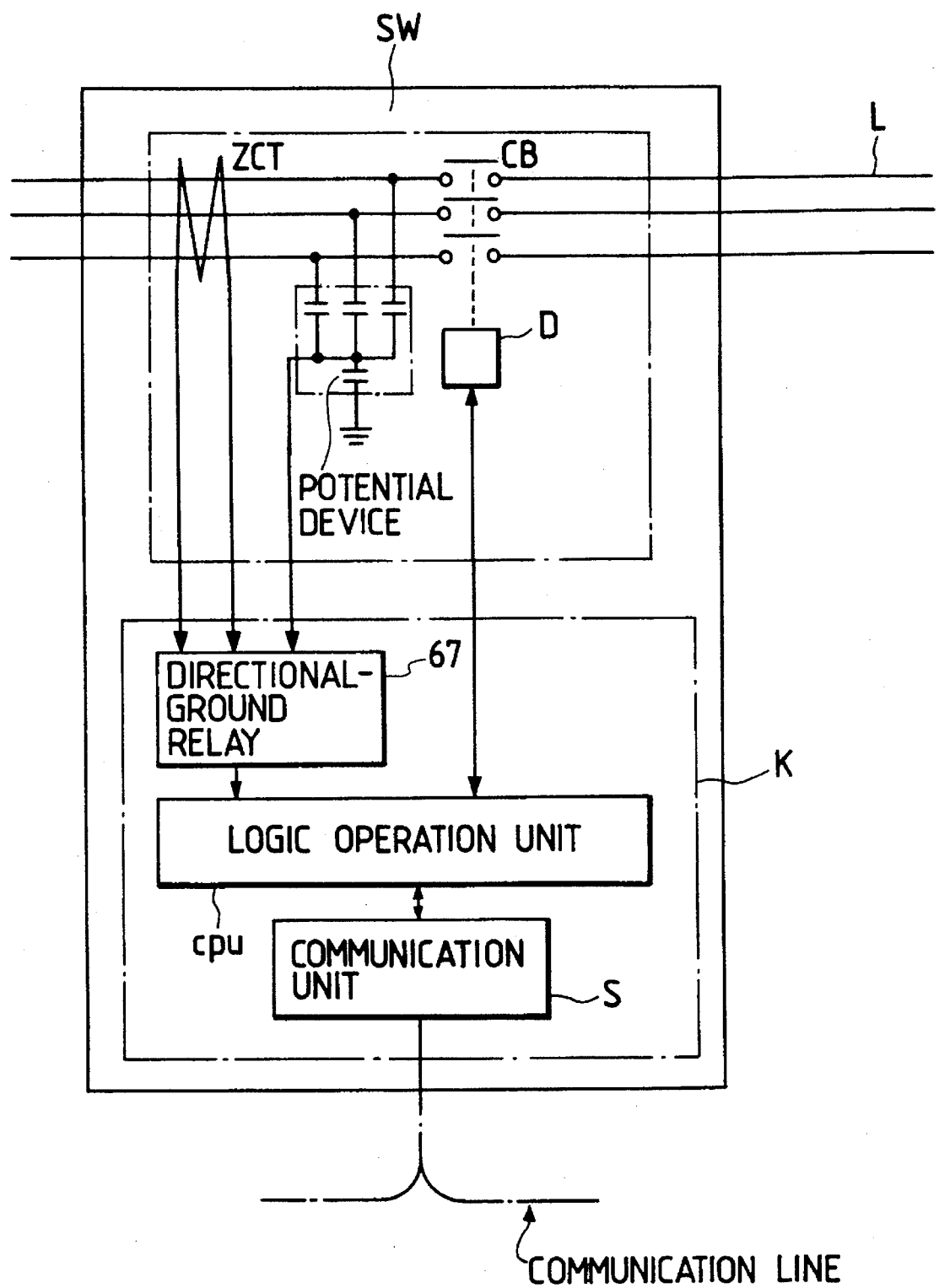
FIG. 2 is a schematic diagram showing a switchgear Sw and a slave station K according to the invention.

With reference to FIG. 2, there is shown an example of a configuration of a slave station K and a switchgear Sw of one aspect of the invention. Of these, the switchgear Sw includes a contactor CB, various detectors (zero-phase sequence current transformer ZCT, zero-phase sequence potential detector ZPD) for detecting the occurrence of a fault, and an actuator D for driving the contactor CB. The slave station K comprises a directional-ground relay 67 for detecting a ground-fault on the basis of various signals from the detectors, a logic operation unit CPU, and a communication unit S.

Figure 3:
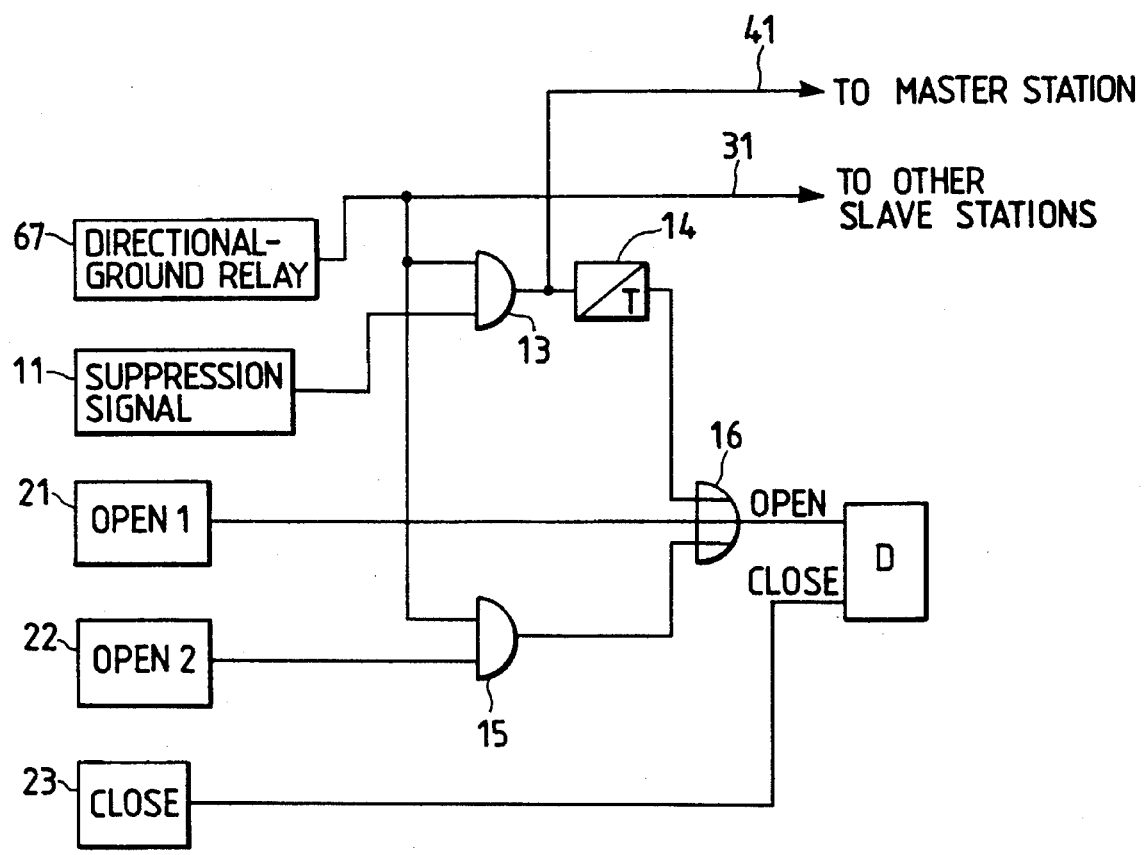
FIG. 3 is a schematic diagram showing a slave station of one embodiment of the invention.

With reference to FIG. 3, there is shown a logic circuit of the logic operation unit CPU of the slave station K. Further, with reference to FIG. 1, if a ground-fault F occurs in a section L3 of the distribution line, the directional-ground relays 67 of K1 and K2 detect the fault and produce an output 31. The output 31 from the directional-ground relay 67 is transmitted from the communication unit S via the communication line C to the slave station k1 in the upstream side of the fault (i.e., located closer to the bus). Thereby, the slave station K1 in the upstream side receives through its communication unit S as its signal 11 the signal 31 transmitted from the slave station K2 in the downstream side, this signal 11 being inputted to a negation input terminal of an AND gate 13 in the slave station K1. The AND gate 13 of the slave station K1 in the upstream side will not produce an output eventually, and thereby the contactor CB will not be operated.

On the other hand, in the remote slave stations K3, K4, K5 and K6 farther down stream from the fault section L3, respective ground-fault directional relays will not operate. Thus, at the event of fault F in the distribution line section L3, only the slave station K2 which is closest to and on the upstream side of the fault is allowed to obtain a signal from the AND gate 13. The signal from the AND gate 13 is a so-called trip signal, which after the duration of a preset period of time T1, for example, of 0.6 sec. marked by a timer 14, opens its corresponding switchgear Sw2.

Further, an output signal from the AND gate 13 is transmitted as a signal 41 attached with an address of its slave station to the master station. As can be clearly understood from the description hereinabove, it is only such a slave station which is adjacent to the fault point and on the upstream side toward the bus bar that is allowed to open its switchgear Sw. Thereby, it is possible for the master station upon reception of the signal 41 to pinpoint the fault section from the address of the slave station attached therewith.

Figure 4:
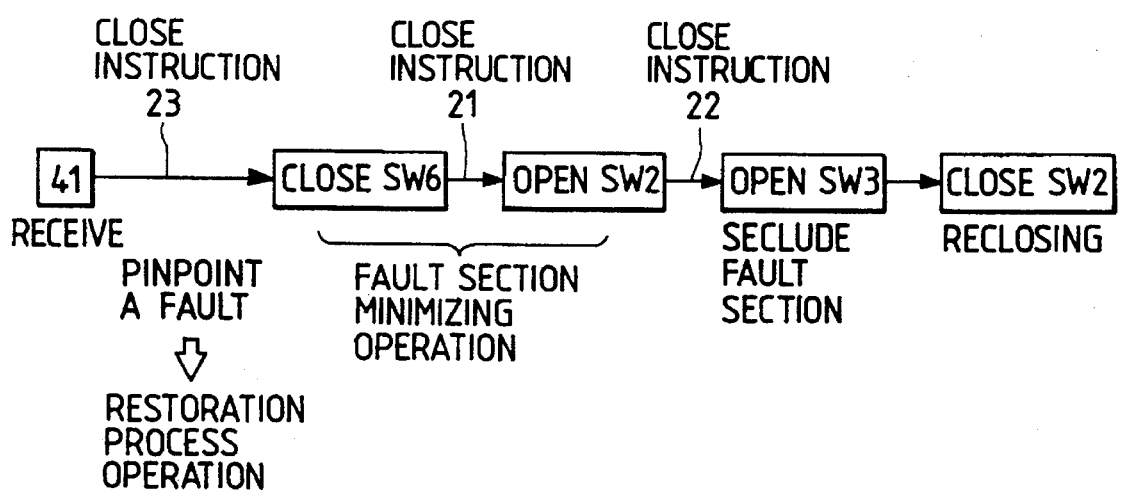
FIG. 4 is a schematic diagram showing a master station of one embodiment of the invention.

With reference to FIG. 4, there is shown a nonlimiting example of functions of the master station that are related to the fault restoration procedures according to the subject invention. First, upon reception of the above-mentioned signal 41 from the corresponding slave station, the master station pinpoints a fault section L3 from the address of the corresponding slave station K2 and transmits a close instruction signal 23 to a slave station K6 which presently is a tie point. The logic operation unit CPU (see FIG. 3) in the slave station K6, upon reception of the close instruction signal 23, causes its actuator D to close its switchgear Sw6. The time required for completing the closure of the switchgear Sw6 from the occurrence of the fault is approximately 0.4 sec.

Through these operations, a power supply connection referred to as a loopwise connection is implemented, whereby all of the distribution line is supplied by both of the bus bars during this period of time.

Next, the master station transmits an open instruction 21 to the slave station K2 which has transmitted the fault signal 41. Upon reception of the open instruction 21, the logic operation unit CPU of the slave station K2 (refer to Fig.3) executes the open instruction to open its switchgear Sw2 through its OR gate 16 and actuator unit D. The opening of the switchgear Sw2 is carried out immediately after the closing of the switchgear Sw6 at the above-mentioned tie point, within approximately 0.6 sec after the occurrence of the fault, illustratively. Although the switchgear Sw2 is opened, the switchgear Sw6 having been closed preceding thereto, there will be no service interruption section to take place on the distribution line due to the opening of the switchgear Sw2. Thereafter, the switchgear Sw2 becomes a new tie point.

In this condition, sections L1, L2 are supplied with power from the first bus bar Bus 1 and sections from L3 to L7 are supplied with power from the second bus bar Bus 2, whereby the fault point F is shifted from the first distribution line (sections to be supplied from the first bus bar Bus 1) to the second distribution line (those to be supplied from the second bus bar Bus 2). Since the fault on the first distribution line has been removed substantially, the protection relay Ry1 of the circuit breaker FCB 1 is reset.

Further, the switchgear Sw2 may be opened either in response to a signal from the master station, or the signal from a timer 14 of the slave station K2 which is started by the detection of the occurrence of the fault. In this respect, this protection means is a duplexed system thus substantially increasing the system reliability. According to the present invention, the following advantage is implemented through the abovementioned operations. That is, the power supply from the bus 1 to the first distribution line will not be interrupted, since the directional ground-fault relay installed on the FCB1 will complete its operation within 0.7 sec before the FCB1 operates.

By way of example, since the fault point F has been transferred from the first distribution line to the second distribution line, a protection relay Ry 2 of a circuit breaker FCB 2 has initiated its operation assigned thereto, whereby the circuit breaker FCB 2 of the second distribution line will be opened in 0.7 sec thereafter if no particular measure is taken, causing an outage section to occur on the distribution line. As a countermeasure against such, the following procedure is provided to be taken with respect to the second distribution line according to the invention.

With reference to FIG. 4, the master station M provides an open instruction 22 so as to cut off the fault section to the slave station K3 which is on the load side of the slave station K2 which initially reported the occurrence of the fault. The open instruction 22 entered to an AND gate 15 enables the switchgear Sw to be opened by means of the actuator circuit D, on the condition that there exists a signal validating operation of the directional-ground relay 67.

According to the above-mentioned process, and if the fault F is a restorative-cause fault and extinguished, the directional-ground relay 67 in the slave station K3 is not being operated yet, and an output of the AND gate 15 is not established, then the switchgear Sw3 thereof will not be opened. In this exemplary case, there occurs no service interruption section on the distribution line throughout the period prior to and after the occurrence of the fault, with the switchgear Sw2 merely having been opened.

When the fault F is a persistent-cause fault, the fault continues in the second distribution line. Therefore, the directional-ground relay 67 in the slave station K3 is in operation, which eventually will produce an output in the AND gate 15 to open the switchgear Sw3. In such a case of the persistent-cause fault, the switchgears Sw2 and Sw3 are opened, thus causing a service interruption section to take place in the section L3. However, this service interruption section can be minimized by being limited to the L3 section as above where the fault persists. Moreover, a subsequent reclosing operation at an appropriate timing is carried out in consideration of the ground fault being extinguished.

Figure 5:
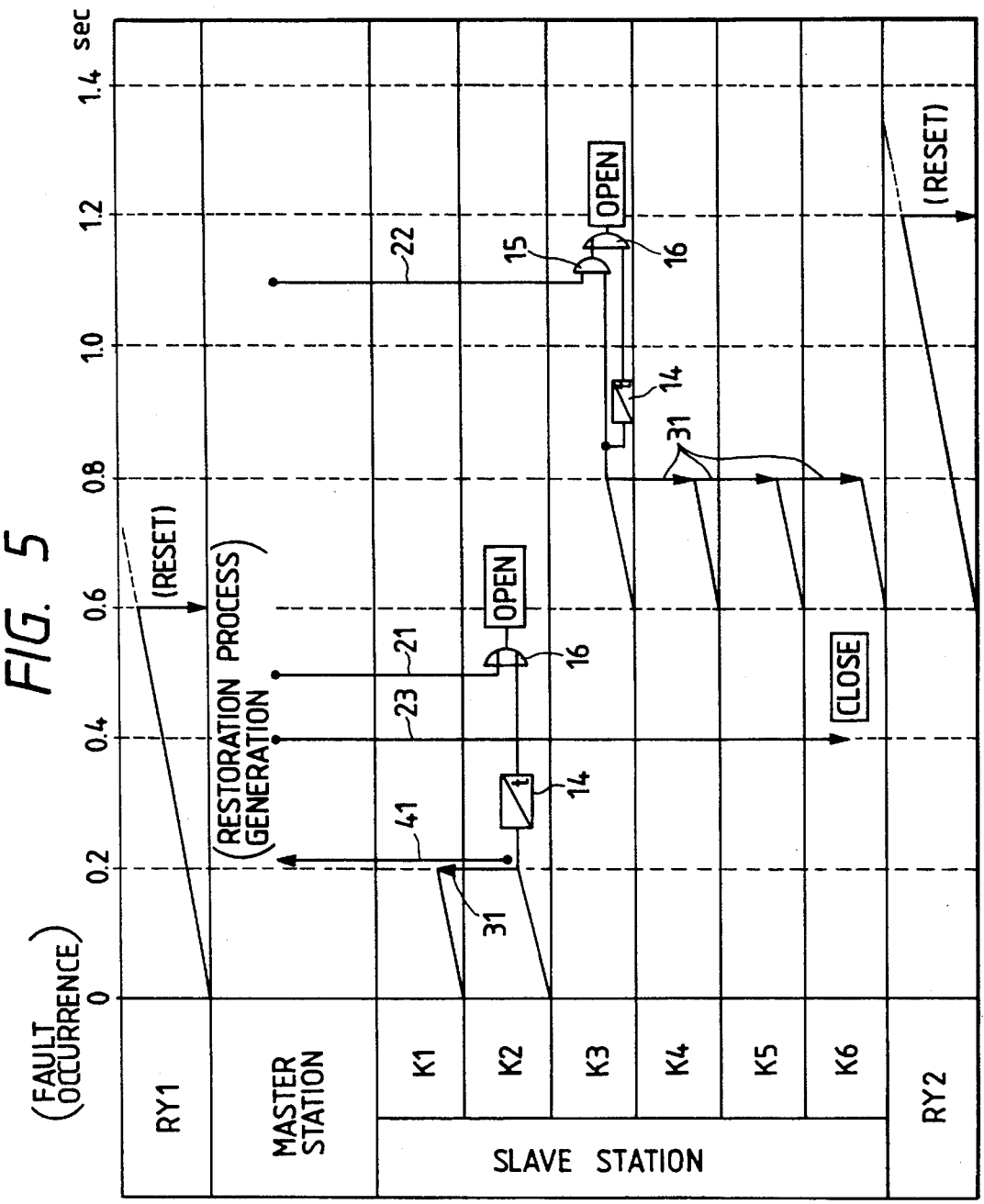
FIG. 5 is a time-chart diagram showing overall operations according to the invention.
Figure 6:
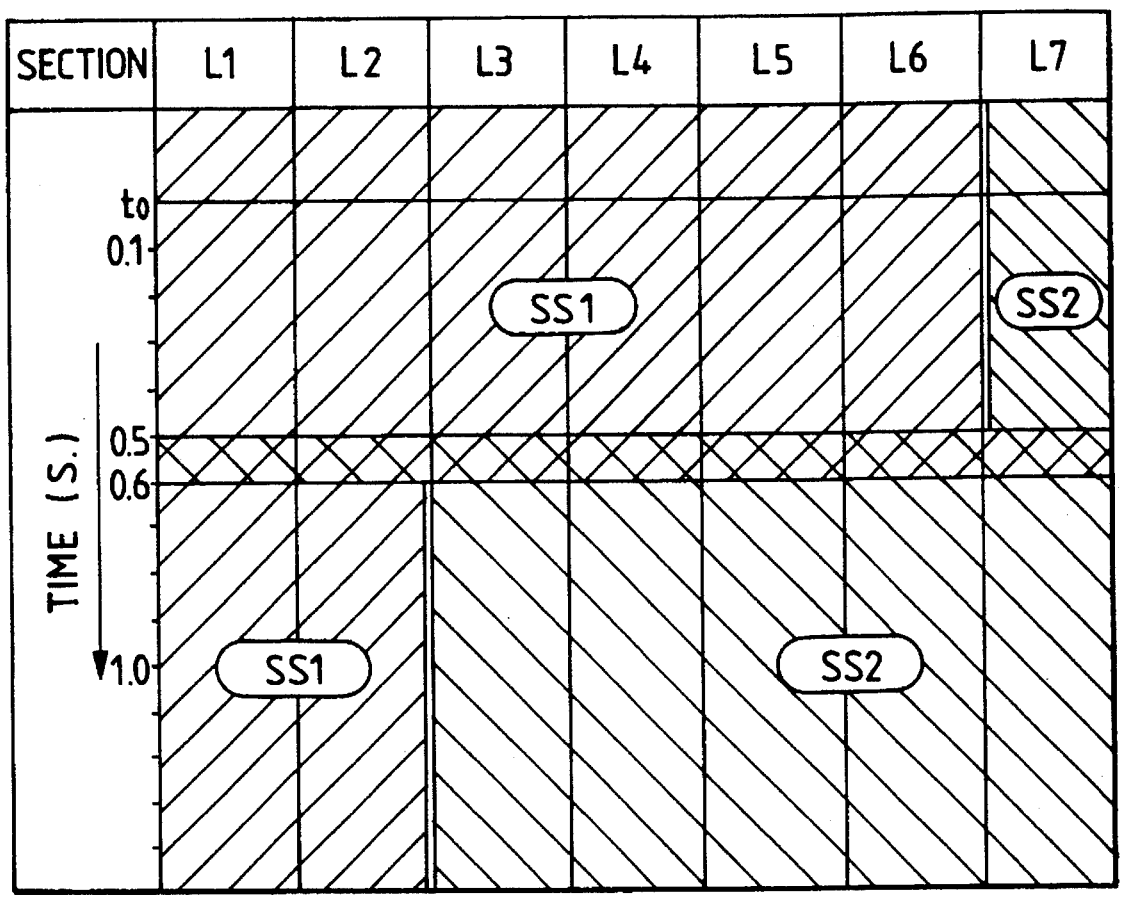
FIG. 6 is a diagram showing loading conditions in time sequence at the time of a restorative-cause fault.
Figure 7:
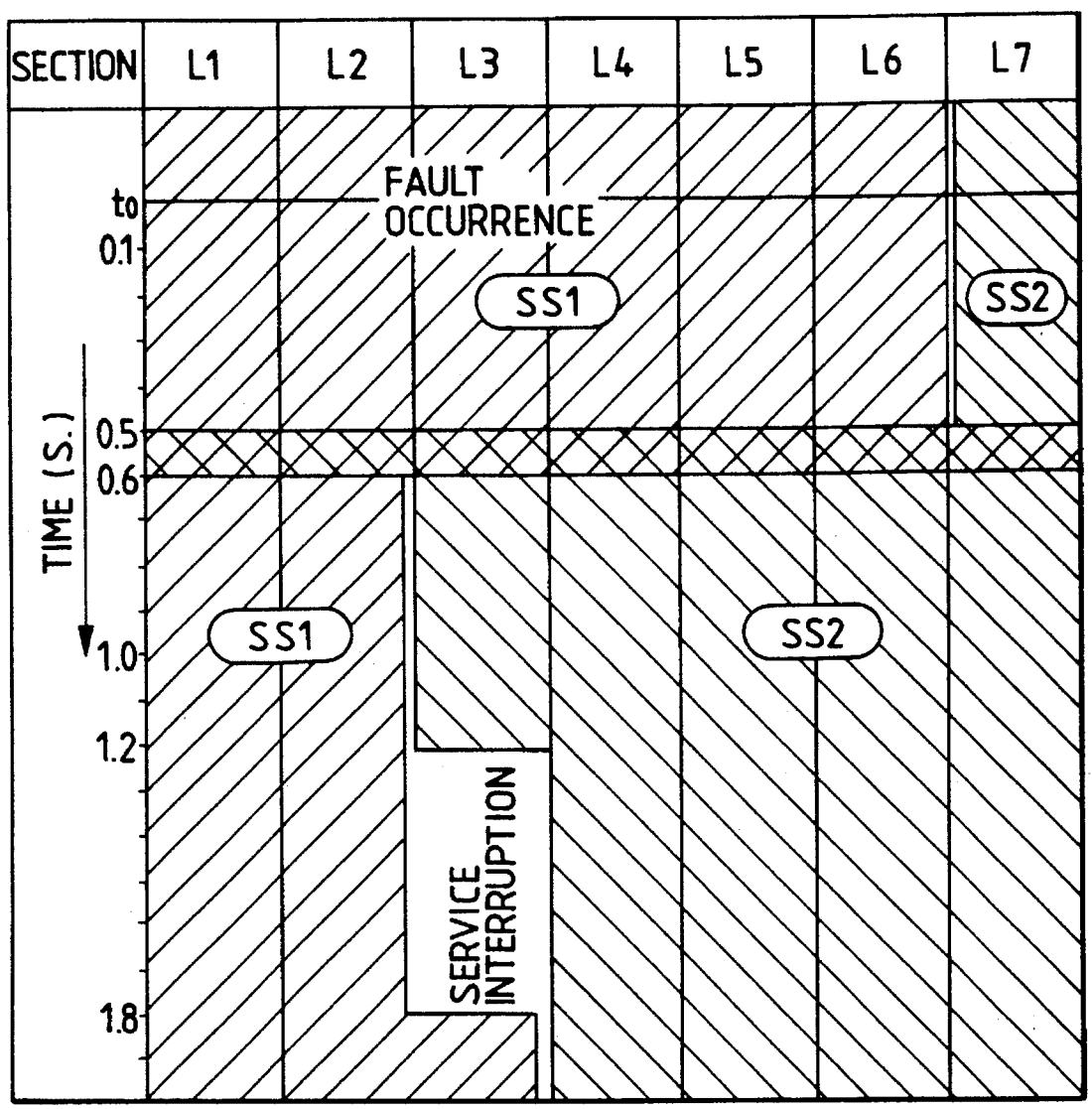
FIG. 7 is a diagram showing loading conditions in time sequence at the time of a persistent-cause fault.

FIG. 5 shows in time sequences respective operations of the protective relay Ry of the circuit breaker FCB, the slave station of FIG. 3, and the master station of FIG. 4, further descriptions of which are omitted because they can be readily understood from the explanation heretofore. Further, FIGS. 6 and 7 show loading conditions at respective service sections on the distribution line in time sequence in the cases of a restorative-cause fault and a persistent-cause fault, respectively. In these drawings, sections with slash lines running from upper right to lower left denote those loaded from the first bus bar Bus 1, while sections with slash lines running from upper left to lower right denote those loaded from the second bus bar Bus 2. Such portions where lines are crossed imply that they are loaded from both of the bus bars, and where no line appears denote a service interruption section.

In the embodiment of the invention described above, operations such as closing at the tie point, openings of the slave station which detected the fault occurrence, and of a slave station which is on the load side, i.e., downstream side of the slave station which detected the fault, are carried out sequentially in response to an instruction from the master station. These operations, however, can be also implemented, not relying on the master station, but between the slave stations themselves. For example, it may be arranged such that a particular slave station which has detected a fault occurrence informs other slave stations of the fault occurrence, then upon reception thereof a slave station at the tie point and another adjacent slave station on the opposite end carry out their preset operations assigned variably thereto in each preset time limit. Preferably, such operations are stored beforehand in slave stations and enabled by an instruction from the master station.

According to the present invention, there have been accomplished such advantages and effects that there occurs no service interruption section on the distribution line in the case of a recoverable fault, and the service interruption section is limited to only the faulty section in the case of a persistent-cause fault.

What is claimed is:

1. A service interruption minimization system for a power distribution line, comprising:

first and second distribution lines each respectively connected to first and second bus bars via first and second circuit breakers, respectively, and having switchgears disposed at appropriate sites thereof, one of said switchgears serving as a tie point switchgear disposed between end portions of said first and said second distribution lines, the tie point switchgear being in an open state normally;

a protective relay for opening said first circuit breaker upon elapse of a preset time after occurrence of a fault on the first distribution line;

closing means for closing said tie point switchgear upon occurrence of a fault defining a load side of the fault and a bus bar side of the fault on said first distribution line;

first opening means for opening a first switchgear which is adjacent to said fault point and located on the bus bar side of said fault point after closing of said tie point switchgear by said closing means; and second opening means for opening a second switchgear which is adjacent to said fault point and located on the load side of said fault point, the opening of said second switchgear being executed on the condition that the fault still remains after the opening of said first switchgear;

wherein said second switchgear is effected to open within a preset period of time preset for said protective relay to start its operation.

2. A service interruption minimization system for a power distribution line, comprising:

first and second distribution lines each respectively connected to first and second bus bars via first and second circuit breakers, respectively, and having switchgears disposed at appropriate sites thereof, one of said switchgears serving as a tie point switchgear disposed between the end portions of said first and said second distribution lines, the tie point switchgear being in an open state normally;

a protective relay for opening the first circuit breaker upon elapse of a preset time after the occurrence of a fault on the first distribution line; and a master station connected to said switchgears via a communication line;

wherein said master station transmits a closing instruction to close said tie point switchgear upon the occurrence of a fault on the first distribution line, pinpoints a fault point defining a load side and a bus bar side of the fault point to impart an open instruction to open a first switchgear adjacent to the fault point and on the bus bar side of the fault point, then permits for a second switchgear to open which is adjacent to said fault point and on the load side of the fault point, wherein all these series of operations from fault occurrence to the opening of the second switchgear are carried out within a preset period of time preset for said protective relay to start its operation.

3. A service interruption minimization system for a power distribution line according to claim 2, wherein each switchgear includes a fault detection function, and transmits a fault detection signal via said communication line, and wherein the master station pinpoints the fault point in dependence on a fault detection signal transmitted from the switchgear which has detected the fault.

4. A service interruption minimization system for a power distribution line according to claim 2, wherein each switchgear includes a fault detection function, a transmission function for transmitting a fault detection signal via said communication line, and a function to open one of the switchgears when it receives no fault detection signal from the load side of the fault point or in response to an instruction from the master station.

5. An operating method for operating power distribution lines comprising the steps of:

supplying a first distribution line from a first bus bar, and a second distribution line from a second bus bar under normal operating conditions;

shifting a power supply state when a fault occurs in the first distribution line to such where both distribution lines are supplied both from the first and the second bus bars; and subsequently shifting to another supply state where a portion of the first distribution line without inclusion of the fault point is supplied from the first bus bar, and the remaining portions of the first distribution line and the second distribution line are supplied from the second bus bar.

6. An operating method for operating power distribution lines comprising the steps of:

supplying a first distribution line from a first bus bar, and a second distribution line from a second bus bar under normal operating conditions;

shifting a power supply state when a fault occurs in the first distribution line to such where both distribution lines are supplied both from the first and the second bus bars; and subsequently, shifting to another supply state where a portion of the first distribution line without inclusion of the fault point is supplied from the first bus bar, and the remaining portions of the first distribution line and the second distribution line are supplied from the second bus bar; and removing the fault point from power supply sections to be supplied from the second bus bar.

* * * * *